United States Patent [19]

Hofer et al.

[11] Patent Number: 4,973,648

[45] Date of Patent: Nov. 27, 1990

[54] EPOXY RESIN COMPOSITIONS

[75] Inventors: Arnold Hofer, Muttenz; Hans Gempeler, Aesch, both of Switzerland

[73] Assignee: Ciba-Geigy Corporation, Ardsley, N.Y.

[21] Appl. No.: 411,949

[22] Filed: Sep. 25, 1989

[30] Foreign Application Priority Data

Sep. 29, 1988 [CH] Switzerland .......................... 3622/88

[51] Int. Cl.$^5$ ............................................. C08G 59/68
[52] U.S. Cl. ................................... 528/94; 252/182.23
[58] Field of Search ..................... 528/94; 252/182.23

[56] References Cited

U.S. PATENT DOCUMENTS

| | | | |
|---|---|---|---|
| 3,275,708 | 9/1966 | Bylsma | 525/396 |
| 4,474,935 | 10/1984 | Lopez | 528/94 X |
| 4,885,354 | 12/1989 | Hofer et al. | 528/94 |
| 4,925,901 | 5/1990 | Bertram et al. | 528/94 X |

*Primary Examiner*—Earl Nielsen
*Attorney, Agent, or Firm*—JoAnn Villamizar

[57] ABSTRACT

An epoxy resin composition comprising an epoxy resin which is solid at room temperature and contains on average more than epoxy group per molecule, and a quaternary morpholinium salt as advancement catalyst.

When advanced with compounds containing two phenolic hydroxyl groups, these compositions give excellent products of low viscosity which are suitable, for example, for use in powder resin coating.

7 Claims, No Drawings

EPOXY RESIN COMPOSITIONS

The present invention relates to epoxy resin compositions which can be advanced in the presence of morpholinium salts, as well as to the use of said salts as advancement catalysts for epoxy resins.

By advancement of epoxy resins is generally meant a chain lengthening and, associated therewith, an increase in the molecular weight of the epoxy resins. A principal factor in this connection is the selectivity of the catalyst employed which shall ensure the formation of polyhydroxy ethers.

Concurrently with the selectivity, advancement catalysts shall be sufficiently reactive to facilitate the formation of linear, solid advanced epoxy resins of higher molecular weight at an economically useful rate. Owing to the opening of the epoxide ring, high reaction rates are accompanied by pronounced evolution of heat, and the heat so generated can be used for heating the reaction mixture.

Many compounds have been proposed or described as catalysts for the advancement of liquid epoxy resins. Some of these compounds, however, are not selective and cause branching or crosslinking. Others are in turn ineffective for promoting the strongly exothermic advancement reactions to form a satisfactorily advanced linear solid epoxy resin at a useful rate.

Known advancement catalysts are, for example, tetraalkylammonium hydroxides or halides (q.v. U.S. Pat. No. 4 465 722). In addition, N-methyl-morpholine has been proposed as advancement catalyst in U.S. Pat. No. 3,275,708.

The advanced epoxy resins prepared by known processes do not, however, meet in all respects the stringent demands which are made of such products at the present time. Hence it is the object of the present invention to provide advanced epoxy resins which are distinguished, in particular, by lower viscosity. In addition, high temperature resistance and high linearity are sought. An undesirable side-effect of the prior art catalysts is the cleavage of chemical compounds in the reaction mixture, which not only adversely affects the homogeneity of the desired product, but also results also in poorer colour properties of the advanced product having to be tolerated.

The present invention relates to epoxy resin compositions comprising an epoxy resin which is solid at room temperature and contains on average more than one epoxy group per molecule, and at least one quaternary morpholinium bromide or morpholinium iodide as advancement catalyst.

Suitable epoxy compounds are in particular those having a relatively low molecular weight, for example lower than 3,500, preferably lower than 2,000 and, most preferably, in the range from 175 to 350. The diglycidyl compounds which are preferably used may be ethers or esters, and the glycidyl groups may also be attached to nitrogen atoms. The phenols from which the ethers are derived are, for example: mononuclear diphenols (for example resorcinol), naphthalenes containing two hydroxyl groups, for example 1,4-dihydroxynaphthalene, biphenyls and other binuclear aromatic compounds which contain a methylene, isopropylidene, O—, SO$_2$—, or S— bridge and two hydroxyl groups attached to the aromatic nuclei, for example preferably bisphenol A, bisphenol F or bisphenol S, and in which the benzene nuclei may also contain halogen atoms, for example tetrabromobisphenol A. The glycidyl esters are based, for example, on phthalic acid, terephthalic acid, tetrahydrophthalic acid, hexahydrophthalic acid, adipic acid, trimethyladipic acid or sebacic acid. Also suitable are mononuclear hydantoins which carry glycidyl groups at the nitrogen atoms, for example N,N'-diglycidylhydantoins. Other glycidyl compounds which contain nitrogen-containing rings are derived from 5,6-dihydrouracils or barbituric acids.

These products are known and most are commercially available.

The advancement catalysts used in the practice of this invention are, for example, morpholinium salts of formula I

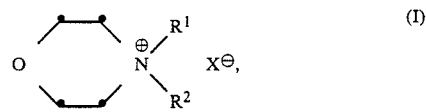

wherein R$^1$ is C$_1$–C$_8$alkyl and R$^2$ is C$_1$–C$_8$alkyl, C$_2$–C$_8$-hydroxyalkyl, C$_4$–C$_8$alkoxyhydroxyalkyl, C$_2$–C$_8$alkenyl, C$_3$–C$_8$alkoxycarbonylalkyl, C$_3$–C$_8$alkylcarbonylalkyl, C$_7$–C$_9$phenylalkyl, C$_7$–C$_9$phenylhydroxyalkyl or phenylcarbonylmethyl and X is bromo or iodo.

Suitable morpholinium salts are preferably those of formula (I), wherein R$^1$ is C$_1$–C$_8$alkyl and R$^2$ is C$_1$–C$_8$alkyl, C$_2$–C$_8$hydroxyalkyl or benzyl, and X is bromo or iodo.

C$_1$–C$_8$Alkyl radicals, preferably C$_1$–C$_4$alkyl radicals, are suitably methyl, ethyl, n-propyl, n-butyl, n-hexyl or n-octyl. These radicals may carry—preferably in 2-position (if available)—a hydroxy group. Preferably R$^1$ is methyl or ethyl and R$^2$ is ethyl.

C$_4$–C$_8$Alkoxyhydroxyalkyl radicals are radicals which contain an ether function as well as a hydroxyl group. Exemplary of such radicals is (2-hydroxy-3-butoxy)propyl.

R$^2$ as alkenyl may be allyl or methallyl. R$^2$ may further be acetonyl, ethoxycarbonylmethyl, (2-hydroxy-2-phenyl)ethyl or phenylcarbonylmethyl.

X is bromo or iodo. Iodo is preferred.

The compounds of formula I are known and can be prepared in known manner, for example by reacting a morpholine of formula II

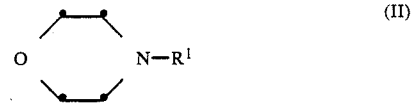

with a compound of formula III

R$^2$—X.

In this connection, attention is drawn to the Examples herein.

The suitable morpholinium salt is used in catalytic amounts, for example in an amount of ca. 10 bis 6000, preferably 50 to 4000 and, most preferably, 100 to 3000 ppm, based on the basic resin.

The advancement reaction is carried out in known manner, for example by reacting the epoxy resin with compounds which preferably contain two phenolic hydroxyl groups.

In this reaction it is possible to use all aromatic compounds containing preferably two phenolic hydroxyl groups and known in the technology of advancement. Typical examples of such compounds are: mononuclear diphenols (for example resorcinol), naphthalenes containing two hydroxyl groups, for example 1,4-dihydroxynaphthalene, biphenyls and other binuclear aromatic compounds which contain a methylene, isopropylidene, O—, $SO_2$—, or S— bridge and two hydroxyl groups attached to the aromatic nuclei, for example preferably bisphenol A, bisphenol F or bisphenol S, and in which the benzene nuclei may also contain halogen atoms, for example tetrabromobisphenol A.

The amount of the phenol will depend on the type of product desired. The greater the amount, the higher the molecular weight of the final product will normally be. The melting point will also increase and the physical and chemical properties of the resin obtained will undergo change.

The advancement methods and the mode of carrying them out are known and described, for example, in U.S. Pat. Nos. 3,275,708 and 4,465,722.

The reaction is carried out, for example, in the temperature range from 100°–220° C., preferably from 120°–190° C., and under a pressure of 10 to 1000 mbar, preferably 200–800 mbar.

The advanced epoxy resins so obtained are distinguished by high stability of the epoxy value and of the viscosity after exposure to heat. Further, these resins have a low viscosity which is useful for further processing. It has been found that the advancement catalysts used in the practice of this invention have a constant activity in the reaction, and their high selectivity results in the formation of exceedingly linear products. In addition, the use of a chain terminator can be dispensed with. If desired, the use of a monofunctional chain terminator, for example a phenol, is also suitable for carrying out the advancement optimally. The catalysts are effective in relatively small amounts, the reaction proceeds rapidly, and only an insignificant propensity to undesirable phenol cleavage is observed. This last mentioned feature is seen in the good colour constancy of the products.

The cured final products (prepared by crosslinking with customary hardeners for epoxy resins, for example acid anhydrides, polyamines, polyhydric phenols and the like) have good flexibility.

The products can be used for surface protection, for the fabrication of castings, especially in the electrical field, of prepregs and laminates. Their use for the preparation of solid resins as binders for powder coating compositions, for water-soluble primers (for example for automobile bodies), and for can and tube lacquers merits special mention.

Example 1: N-Butyl-N-methylmorpholinium bromide

A sulfonating flask (250 ml) fitted with stirrer, drip funnel and reflux condenser is charged with 22.3 ml (0.2 mol) of N-methylmorpholine and 80 ml of methyl ethyl ketone (MEK), and then 21.4 ml (0.2 mol) of n-butyl bromide are added dropwise over 20 minutes. After initial turbidity under reflux conditions (ca. 80° C.), the reaction mixture becomes more dense and turns an orange-brown colour. After a reaction time of 7 hours, the crystalline slurry is filtered with suction and the filter residue is washed with a small amount of MEK and dried under vacuum. Yield: 23%; m.p. 205° C.

Example 2: N-Butyl-N-methylmorpholinium iodide

The following substances are mixed in a 1 liter flask with ground-glass stopper and reacted in the water bath of a rotary evaporator (temperature: 60° C.):
22.8 ml (0.2 mol) of n-butyl iodide,
80.0 ml of methyl isobutyl ketone (MIBK),
22.3 ml (0.2 mol) of N-methylmorpholine.

After a reaction time of 6 hours, the mixture is diluted with a further 40 ml of MIBK, filtered with suction, and the filter residue is washed and dried. Yield: 28.7 g (50%); m.p. 141° C.

Example 3: N-Ethyl-N-methylmorpholinium iodide

The following substances are reacted in a flask with ground-glass stopper on a water bath of 60° C.:
22.5 g (0.2 mol) of N-methylmorpholine,
70.0 g of methyl ethyl ketone (MEK),
31.4 g (0.2 mol) of ethyl iodide.

After a reaction time of 5 hours, the resultant crystalline slurry is filtered with suction and the filter residue is washed with MEK and dried. Yield: 44.2 g (82%); m.p. 162° C.

Example 4: N-Ethyl-N-hydroxyethylmorpholinium iodide

The following reactants are reacted in a flask with ground-glass stopper on the water bath of a rotary evaporator:
25.8 ml (0.2 mol) N-hydroxymethyl morpholine,
80.0 ml of methyl ethyl ketone (MEK),
16.2 g (0.2 mol) of ethyl iodide.

After a reaction time of 7 hours at 60° C.—while constantly rotating the flask—the reaction mixture is concentrated by distillation and/or stripping until no more volatile constituents condense in the condenser. The material is worked up in a mixture (1:1) of methanol/butanol. Yield: 52.0 g (90%); m.p. 37° C.

Example 5: N-Ethyl-N-propylmorpholinium iodide

The procedure of Example 3 is repeated by mixing the following substances in a 1 liter flask with ground-glass stopper and reacting the mixture at 0° C.:
59.1 g (0.5 mol) of N-ethylmorpholine,
200 ml of methyl isobutyl ketone (MIBK),
85.0 g (0.5 mol) of propyl iodide.

After a reaction time of 6 hours, the crystalline slurry is filtered with suction and the filter residue is washed with MIBK and dried in vacuum drier. Yield: 119.5 g (83%); decomposition point: 240° C.

Example 6: N-Ethoxycarbonylmethyl-N-methylmorpholinium bromide

In accordance with the foregoing Examples, the following substances are reacted in a flask with ground-glass stopper for 6 hours at 50° C.:
23.0 ml (0.2 mol) of ethyl bromoacetate,
100 ml of methyl ethyl ketone (MEK),
22.5 ml (0.2 mol) of N-methylmorpholine.

In the course of the reaction it is expedient to dilute the mixture with a further small amount of MEK. The yield is 53.6 g (84%) after washing with MEK and drying the product in a vacuum drier. Melting point: 150°–155° C.

Example 7: N-Allyl-N-methylmorpholinium bromide

In accordance with the foregoing Examples, the following substances are reacted in a flask with ground-glass stopper for 8 hours at 60° C.:
17.2 ml (0.2 mol) of allyl bromide,
80 ml of methyl ethyl ketone,
22.5 ml (0.2 mol) of N-methylmorpholine.

The reaction mixture is worked up by distillation and stripping under vacuum. The reaction product is a yellowish, very highly viscous liquid. Yield: 43.3 g (97%); $n_{25}{}^D = 1.549$.

ADVANCEMENT REACTIONS

Example 8

With stirring 845 g of bisphenol A diglycidyl ether having an epoxy value of 5.4 eq/kg are mixed in a polymer flask at 40–50° C. with a methanolic solution of N-butyl-N-methylmorpholinium bromide (Example 1), such that the catalyst concentration, based on the resin, is 2000 ppm (8.4 mmol/kg). With stirring, the temperature is simultaneously raised to 100° C. and a first portion of 217 g of bisphenol A is added to the reaction mixture and dissolved. The mixture is heated to 170° C. and a second portion of 217 g of bisphenol A is added. At 180° C. the temperature is kept constant at a partial vacuum of 500 mbar and, after 3–4 hours, the desired epoxy value of 0.6 eq/kg is attained, whereupon the resin melt can be discharged, cooled and comminuted. The viscosity of this resin (40% in butyl carbitol, 25° C.) is 1970 mPa.s and 2350 mPa.s after a heat treatment for 4 hours at 180° C.

Example 9

The procedure of Example 8 is repeated, using N-butyl-N-methylmorpholinium iodide (Example 2) as catalyst. The concentration of the catalyst, based on the basic resin, is 3300 ppm (11.6 mmol/kg). The viscosity is 1570 mPa.s and 2120 mPa.s after a heat treatment.

Example 10

The procedure of Example 8 is repeated, using a methanolic solution of N-ethyl-N-morpholinium iodide as catalyst. The concentration of catalyst is 2000 ppm (7.8 mmol/kg). The viscosity of the resultant product is 1710 mPa.s and 2000 mPa.s after a heat treatment.

Example 11

With stirring, 845 g of bisphenol A diglycidyl ether having an epoxy value of 5.4 eq/kg are heated in a polymer flask and, at 100° C., mixed with a first portion of 217 g of bisphenol A. Then a solution of N-ethyl-(2-hydroxy)ethylmorpholinium iodide (Example 4) in butanol is added as catalyst in a concentration of 4500 ppm (15.7 mmol/kg), based on the basic resin. At the same time, the temperature is raised, with constant stirring, and the second portion of bisphenol A is added at 170° C., the temperature subsequently being kept constant at 180° C. After ca. 3–4 hours the epoxy value of the reaction mixture is 0.60 eq/kg and the resin melt can then be discharged, cooled and comminuted. The viscosity of this product (measured in a 40% solution in butyl carbitol at 25° C. in a Hoeppler viscosimeter) is 1430 mPa.s and 2020 mPa.s after a heat treatment for 4 hours at 180° C.

Example 12

The procedure of Example 8 is repeated, using a methanolic solution of N-ethyl-N-propylmorpholinium iodide (Example 5) as catalyst in a concentration of 2500 ppm (8.8 mmol/kg), based on the basic resin. The viscosity of the product is 1580 mPa.s and 1900 mPa.s after a heat treatment for 4 hours at 180° C.

Example 13

100 g of bisphenol A are fused in a 500 ml sulfonating flask fitted with stirrer, reflux condenser and oil bath, and 1.00 g of the appropriate catalyst is added. With constant stirring, the temperature is raised to 180° and kept for 5 hours. After cooling, the reaction mixture is analysed by HPLC and the phenol content determined:

| Catalyst according to Example | Phenol content |
| --- | --- |
| 1 | 2% |
| 2 | 2% |
| 3 | 1% |
| 4 | 4% |
| 5 | 3% |
| 6 | 7% |
| 7 | 5% |

What is claimed is:

1. An epoxy resin composition comprising an epoxy resin which is solid at room temperature and contains on average more than one epoxy group per molecule, and at least one quaternary morpholinium bromide or morpholinium iodide as advancement catalyst.

2. An epoxy resin composition according to claim 1 comprising diglycidyl compounds having a molecular weight below 3500.

3. An epoxy resin composition according to claim 1 comprising a morpholinium salt of formula I

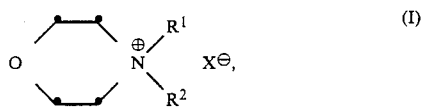

wherein $R^1$ is $C_1$–$C_8$alkyl, $C_2$–$C_8$hydroxyalkyl, $C_4$–$C_8$alkoxyhydroxyalkyl, $C_2$–$C_8$alkenyl, $C_3$–$C_8$alkoxycarbonylalkyl, $C_3$–$C_8$alkylcarbonylalkyl, $C_7$–$C_9$phenylalkyl, $C_7$–$C_9$phenylhydroxyalkyl or phenylcarbonylmethyl, and X is bromo or iodo.

4. An epoxy resin composition according to claim 3 comprising a morpholinium salt of formula I, wherein $R^1$ is $C_1$–$C_8$alkyl and $R^2$ is $C_1$–$C_8$alkyl, $C_2$–$C_8$hydroxyalkyl or benzyl, and X is bromo or iodo.

5. An epoxy resin composition according to claim 3 comprising a morpholinium salt of formula I, wherein $R^1$ is methyl or ethyl and $R^2$ is ethyl.

6. An epoxy resin composition according to claim 1 comprising a morpholinium salt, wherein X is iodo.

7. An epoxy resin composition according to claim 1 additionally comprising a compound which contains two phenolic hydroxyl groups.

* * * * *